(12) United States Patent
Tamaru et al.

(10) Patent No.: US 11,276,903 B2
(45) Date of Patent: Mar. 15, 2022

(54) ELECTRICITY STORAGE DEVICE AND METHOD FOR MANUFACTURING ELECTRICITY STORAGE DEVICE

(71) Applicant: KABUSHIKI KAISHA TOYOTA JIDOSHOKKI, Kariya (JP)

(72) Inventors: Kojiro Tamaru, Kariya (JP); Takayuki Hirose, Kariya (JP); Atsuhiko Nishii, Kariya (JP); Satoshi Endo, Kariya (JP); Tomohiro Nakamura, Kariya (JP)

(73) Assignee: KABUSHIKI KAISHA TOYOTA KIDOSHOKKI, Kariya (JP)

( * ) Notice: Subject to any disclaimer, the term of this patent is extended or adjusted under 35 U.S.C. 154(b) by 420 days.

(21) Appl. No.: 16/326,491

(22) PCT Filed: Jun. 20, 2017

(86) PCT No.: PCT/JP2017/022703
§ 371 (c)(1),
(2) Date: Feb. 19, 2019

(87) PCT Pub. No.: WO2018/055858
PCT Pub. Date: Mar. 29, 2018

(65) Prior Publication Data
US 2021/0280948 A1    Sep. 9, 2021

(30) Foreign Application Priority Data

Sep. 21, 2016  (JP) .............................. JP2016-184388

(51) Int. Cl.
*H01M 50/00* (2021.01)
*H01M 50/474* (2021.01)
(Continued)

(52) U.S. Cl.
CPC .......... *H01M 50/474* (2021.01); *H01G 11/12* (2013.01); *H01G 11/28* (2013.01);
(Continued)

(58) Field of Classification Search
CPC . H01M 5/2485; H01M 8/1004; H01M 8/0276
See application file for complete search history.

(56) References Cited

U.S. PATENT DOCUMENTS 7,220,516 B2    5/2007  Oosawa et al.
2004/0067417 A1  4/2004  Oosawa et al.
(Continued)

FOREIGN PATENT DOCUMENTS

CN    102422476 A    4/2012
DE    60302634 T2    6/2006
(Continued)

OTHER PUBLICATIONS

International Search Report in International Application No. PCT/JP2017/022703, dated Aug. 22, 2017.
(Continued)

*Primary Examiner* — Cynthia H Kelly
*Assistant Examiner* — Monique M Wills
(74) *Attorney, Agent, or Firm* — Sughrue Mion, PLLC

(57) ABSTRACT

An electricity storage device according to one embodiment is an electricity storage device in which a plurality of bipolar electrodes in which a positive electrode layer is provided on one surface of a collector plate and a negative electrode layer is provided on the other surface of the collector plate are stacked via separators and includes a plurality of spacers arranged along peripheral edges of the collector plates between the respective collector plates adjacent to each other in a stacking direction and a resin frame covering outer peripheries of the plurality of spacers.

16 Claims, 10 Drawing Sheets

(51) Int. Cl.
- *H01M 50/477* (2021.01)
- *H01G 11/12* (2013.01)
- *H01G 11/28* (2013.01)
- *H01G 11/78* (2013.01)
- *H01G 11/84* (2013.01)

(52) U.S. Cl.
CPC ............ *H01G 11/78* (2013.01); *H01G 11/84* (2013.01); *H01M 50/477* (2021.01)

(56) References Cited

U.S. PATENT DOCUMENTS

| | | |
|---|---|---|
| 2004/0253512 A1 | 12/2004 | Watanabe et al. |
| 2006/0292443 A1 | 12/2006 | Ogg et al. |
| 2009/0142655 A1 | 6/2009 | West et al. |
| 2010/0151306 A1 | 6/2010 | Fredriksson et al. |
| 2010/0304191 A1 | 12/2010 | West et al. |
| 2012/0070715 A1 | 3/2012 | Obika |
| 2012/0077075 A1 | 3/2012 | Tani et al. |
| 2012/0156584 A1* | 6/2012 | Uehara ............... H01M 8/0267 429/465 |
| 2012/0189895 A1 | 7/2012 | Gutsch et al. |
| 2015/0037662 A1* | 2/2015 | Pinon ................. H01M 50/502 429/179 |
| 2016/0079610 A1* | 3/2016 | Oku ....................... H01M 8/241 429/482 |

FOREIGN PATENT DOCUMENTS

| | | |
|---|---|---|
| JP | 11-274014 A | 10/1999 |
| JP | 2001-155973 A | 6/2001 |
| JP | 2005-259379 A | 9/2005 |
| JP | 2008-140633 A | 6/2008 |
| JP | 2010-212092 A | 9/2010 |
| JP | 2011-501384 A | 1/2011 |
| JP | 2011-100693 A | 5/2011 |
| JP | 2012-524980 A | 10/2012 |
| JP | 2017-16826 A | 1/2017 |
| WO | 2005/091419 A1 | 9/2005 |

OTHER PUBLICATIONS

International Preliminary Report on Patentability with a Translation of Written Opinion in International Application No. PCT/JP2017/022703, dated Apr. 4, 2019.
Communication dated Mar. 9, 2020, from the Intellectual Property of India Patent Office in Indian Application No. 201917002092.

* cited by examiner

Fig.3
(a)
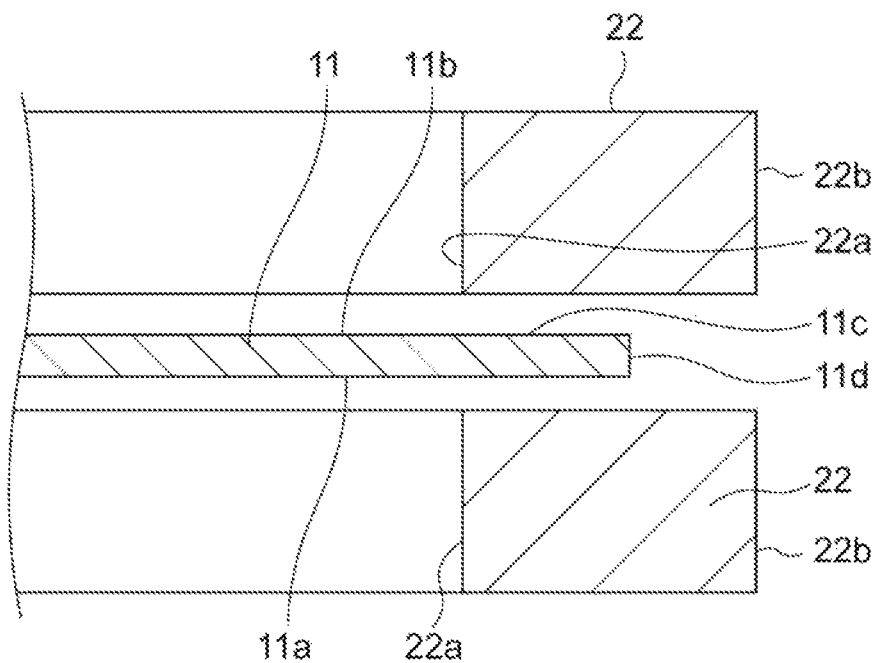
(b)
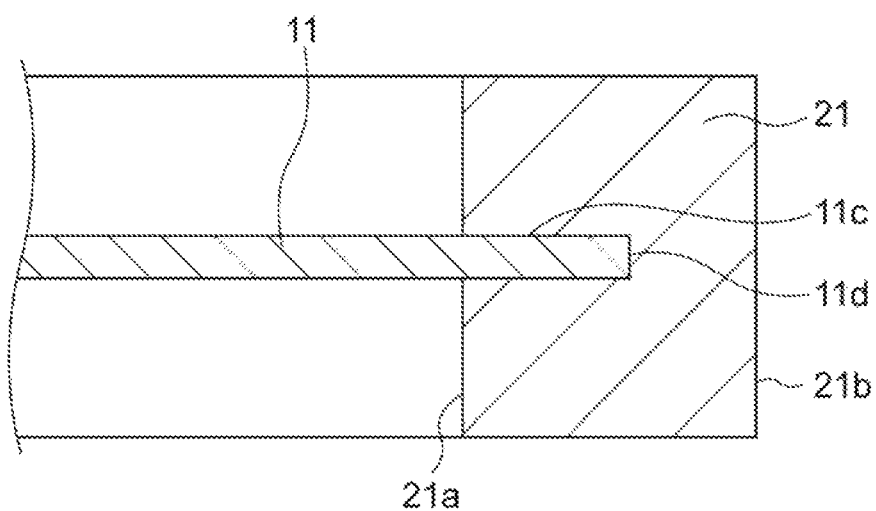

ELECTRICITY STORAGE DEVICE AND METHOD FOR MANUFACTURING ELECTRICITY STORAGE DEVICE

CROSS REFERENCE TO RELATED APPLICATIONS

This application is a National Stage of International Application No. PCT/JP2017/022703 filed Jun. 20, 2017, claiming priority based on Japanese Patent Application No. 2016-184388 filed Sep. 21, 2016.

TECHNICAL FIELD

The present invention relates to an electricity storage device and a method for manufacturing the electricity storage device.

BACKGROUND ART

In the related art, an electricity storage device including a bipolar electrode is known. For example, a battery disclosed in Patent Literature 1 includes a plurality of electrodes in which a positive electrode layer electrically coupled to one surface of a collector is formed and a negative electrode layer electrically coupled to a surface of the opposite side of the collector is formed. These electrodes are stacked via an electrolyte layer to form an electricity generating element. For the purpose of preventing liquid junction due to leakage of an electrolytic solution from the electrolyte layer, a sealing portion is arranged on the outer peripheral portion of the battery.

CITATION LIST

Patent Literature

Patent Literature 1: Japanese Unexamined Patent Publication No. 2010-212092

SUMMARY OF INVENTION

Technical Problem

Generally, in a battery having a structure in which bipolar electrodes are stacked in the stacking direction, the electrodes arranged adjacent to each other in the stacking direction may be in contact with each other, and thus, a short circuit may occur. Therefore, for example, in a battery disclosed in Patent Literature 1, a short circuit is prevented by insulating adjacent electrodes by using sealing portions.

However, the sealing portion disclosed in Patent Literature 1 is primarily intended to prevent leakage of an electrolytic solution, and the sealing portion is pressed by a predetermined amount in the stacking direction. In this case, in order to maintain the height of the stacked body to be uniform, it is necessary to strictly set a crushing amount of each sealing portion, and cross design becomes severe. Therefore, the accuracy requirement for the member is increased, which leads to an increase in production cost.

One aspect of the present invention is to provide an electricity storage device and a method for manufacturing an electricity storage device capable of suppressing a short circuit between electrodes at low cost.

Solution to Problem

According to an aspect of the invention, there is provided an electricity storage device in which a plurality of electrodes in which a positive electrode layer is provided on one surface of a collector plate and a negative electrode layer is provided on the other surface of the collector plate are stacked via separators, the electricity storage device including: a plurality of spacers arranged along peripheral edges of the collector plates between the collector plates adjacent to each other in a stacking direction; and a resin frame covering outer peripheries of the plurality of spacers.

In such an electricity storage device, a short circuit between the collector plates is suppressed by a plurality of spacers arranged between the collector plates adjacent to each other in the stacking direction. In addition, by the resin frame covering outer peripheries of the plurality of spacers, the peripheral edges of the stacked plurality of electrodes are formed in a liquid-tight manner, and thus, the leakage of an electrolytic solution can be prevented. With such a configuration, it is unnecessary to consider the crushing amount and the like, so that the accuracy requirement of each member does not increase. Therefore, it is possible to suppress the short circuit between the electrodes at low cost.

In addition, in one aspect, the spacer and the resin frame may be formed with the same material. In addition, in one aspect, the spacer and the resin frame may be formed with different materials. For example, in a case where it is desired to integrate the spacer and the resin frame by welding or the like, it is preferable that the spacer and the resin frame are formed with the same material.

In addition, in one aspect, an outer periphery of the collector plate may be arranged in the spacer. According to such a configuration, it is possible to bond the spacer and the collector plate in a liquid-tight manner.

In addition, in one aspect, the outer periphery of the collector plate may be arranged in the resin frame. According to such a configuration, it is possible to bond the resin frame and the collector plate more reliably in a liquid-tight manner.

In addition, in one aspect, the outer periphery of the spacer may have a convex shape toward the resin frame. According to such a configuration, it is possible to further suppress contact between the collector plates adjacent to each other.

In addition, in one aspect, a distal end of the outer periphery of the spacer may extend to a position outside the outer periphery of the collector plate. According to such a configuration, it is possible to reliably suppress contact between the collector plates adjacent to each other.

In addition, in one aspect, an inner peripheral surface of the resin frame may have a concave shape corresponding to the convex shape of the outer periphery of the spacer. According to such a configuration, the spacer and the resin frame can be easily allowed to be in close contact with each other.

In addition, in one aspect, an incision continuous from the outer periphery may be formed on the peripheral edge of the collector plate. Since the peripheral edge of the collector plate is easy to move by the incision, it is possible to suppress occurrence of wrinkles and the like.

In addition, in one aspect, the spacer has a first portion overlapping with the resin frame when viewed from the stacking direction and a second portion extending inward from the resin frame when viewed from the stacking direction. The first portion may be bonded to the resin frame, and the second portion may be bonded to the collector plate. Since the rigidity of the collector plate can be improved by the second portion bonded to the collector plate, it is possible to suppress deformation of the electricity storage device due to an external force such as an internal pressure.

In addition, in one aspect, the second portion may not overlap with any of the positive electrode layer and the negative electrode layer when viewed from the stacking direction, and the second portion may have a portion overlapping with the separator when viewed from the stacking direction. According to such a configuration, since a region where the spacer and the separator overlap with each other can be appropriately secured, it is possible to effectively suppress a short circuit between the collector plates.

In addition, in one aspect, the spacer and the resin frame may be formed with the same material. For example, in a case where the spacer and the resin frame are integrated by welding or the like, it is preferable that the spacer and the resin frame are formed with the same material.

In addition, in one aspect, the spacer may be formed in a frame shape when viewed from the stacking direction. According to such a configuration, it is possible to simplify the shape of the spacer.

In addition, in one aspect, the electricity storage device may further include a connection portion that connects end portions of the spacers adjacent to each other in the stacking direction. According to such a configuration, by providing the connection portion, it is possible to suppress the warping of the spacer. As a result, it is possible to effectively suppress occurrence of stacking misalignment of the plurality of electrodes.

In addition, in one aspect, a protrusion amount of the spacer from an end surface of the collector plate that faces in a direction intersecting the stacking direction may be equal to or larger than a thickness of the spacer in the stacking direction. According to such a configuration, it is possible to alleviate restrictions on a construction method at the time of brining the resin frame. For example, it is easy to bond the resin frame to the spacer by hot plate welding by using the protrusion portion (that is, the first portion) of the spacer having a protrusion amount equal to or larger than a predetermined value as described above.

In addition, in one aspect, the resin frame may be formed by injection molding. In addition, in one aspect, the resin frame may be formed by hot plate welding to the spacer. According to such a configuration, it is possible to form the peripheral edges of the stacked plurality of electrodes in a liquid-tight manner by the resin frame, and thus, it is possible to prevent leakage of an electrolytic solution.

In addition, according to an aspect of the invention, there is provided a method for manufacturing an electricity storage device, including processes of: fixing spacers to peripheral edges of collector plates in electrodes in which a positive electrode layer is provided on one surface of the collector plate and a negative electrode layer is provided on the other surface of the collector plate; stacking a plurality of electrodes to which the spacers are fixed; and forming a resin frame by injection molding or hot plate welding to the spacers so as to cover outer peripheries of the spacers fixed to the stacked plurality of electrodes.

According to such a method for manufacturing an electricity storage device, the spacers are fixed to the peripheral edges of the collector plates, and after that, the electrodes are stacked, so that the respective spacers are arranged between the collector plates adjacent to each other in the stacking direction. With this spacer, a short circuit between the collector plates is suppressed. In addition, by the resin frame collectively covering the outer peripheries of the plurality of spacers, the peripheral edges of the stacked plurality of electrodes are formed in a liquid-tight manner, and thus, leakage of an electrolytic solution is prevented. Since the resin frame is formed by injection molding or hot plate welding to the spacer, it is possible to easily manufacture the resin frame. Therefore, it is possible to suppress the short circuit between the electrodes at low cost.

In addition, in one aspect, the manufacturing method may further include a process of connecting end portions of the spacers adjacent to each other in the stacking direction before the process of forming the resin frame. According to such a configuration, it is possible to form the resin frame in a state where the warping of the spacer is suppressed. As a result, it is possible to suppress stacking misalignment of a plurality of electrodes.

Advantageous Effects of Invention

According to one aspect of the electricity storage device and the method for manufacturing the electricity storage device, it is possible to suppress a short circuit between the electrodes at low cost.

BRIEF DESCRIPTION OF DRAWINGS

FIG. 3 is a view illustrating a manufacturing process of the electricity storage device.

DESCRIPTION OF EMBODIMENTS

Figure 1:
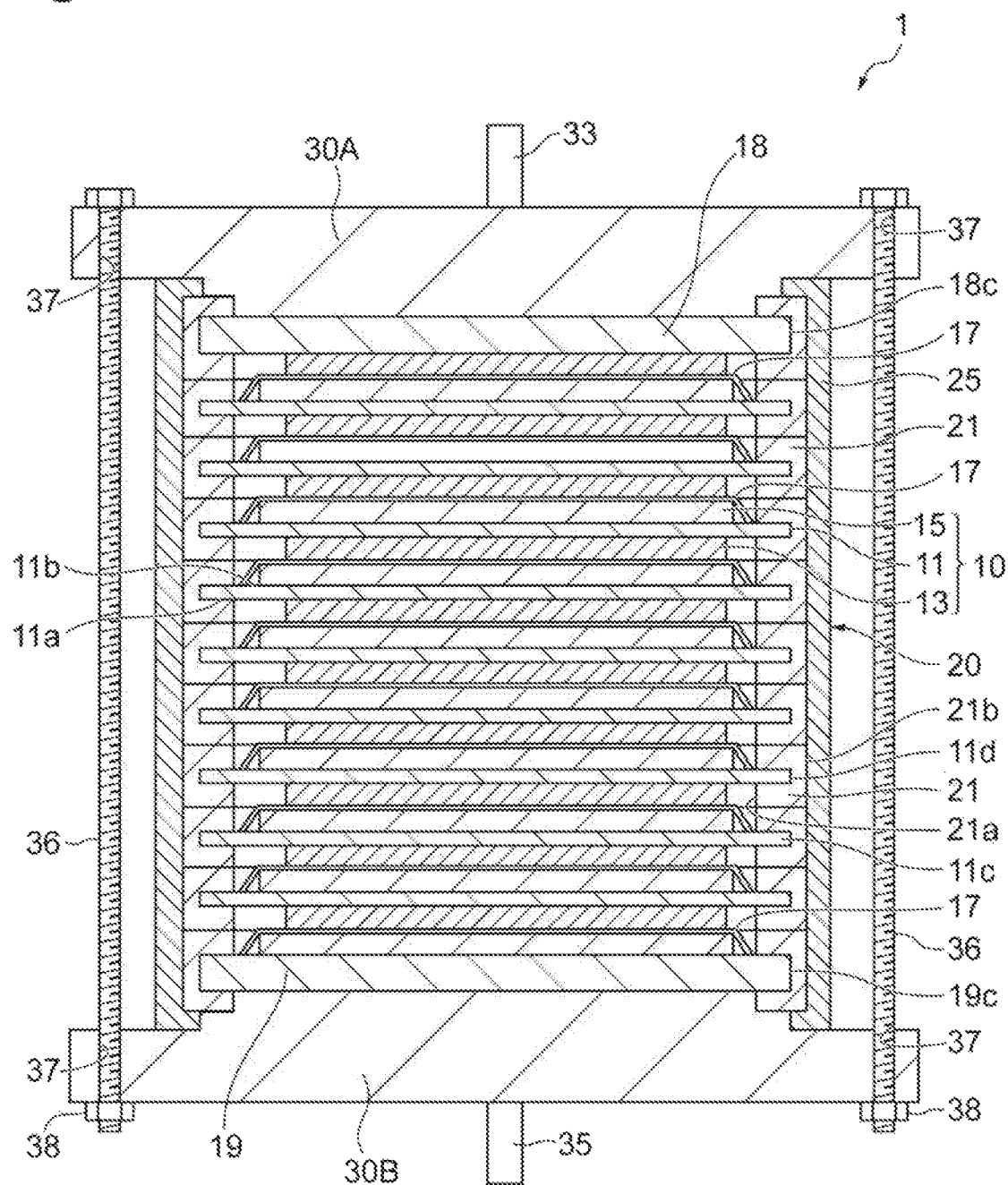
FIG. 1 is a cross-sectional view schematically illustrating an electricity storage device according to a first embodiment.

Hereinafter, embodiments of the present invention will be described in detail with reference to the drawings. For the convenience, substantially the same elements are denoted by the same reference numerals, and the description thereof may be omitted.

First Embodiment

Figure 2:
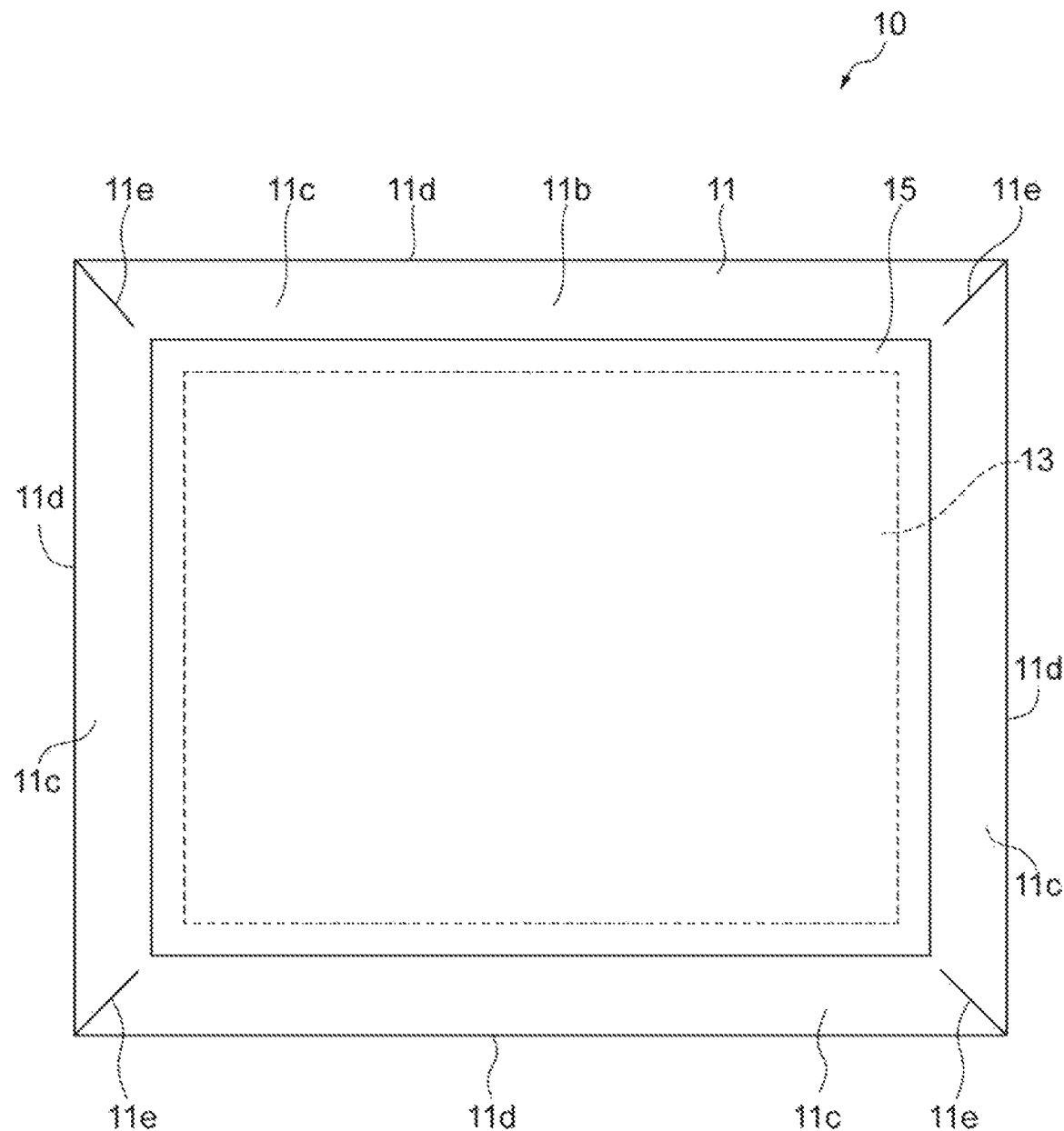
FIG. 2 is a plan view schematically illustrating a bipolar electrode.

FIG. 1 is a cross-sectional view schematically illustrating a configuration of an electricity storage device according to one embodiment of the present invention. FIG. 2 is a plan view schematically illustrating a bipolar electrode used in the electricity storage device. An electricity storage device 1 illustrated in FIG. 1 is, for example, a secondary battery such as a nickel hydrogen secondary battery, or a lithium ion secondary battery or is an electric double layer capacitor. The electricity storage device 1 is used as a battery of various vehicles such as a forklift, a hybrid vehicle, and an electric vehicle. In the following description, a nickel hydrogen secondary battery will be exemplified.

As illustrated in FIG. 1, the electricity storage device 1 includes a plurality of bipolar electrodes 10, a frame 20, and a pair of restraining plates 30A and 30B. The bipolar electrode 10 includes a collector plate 11, a positive electrode layer 13 provided on one surface 11a of the collector plate 11, and a negative electrode layer 15 provided on the other surface 11b (surface opposite to the one surface 11a of the collector plate 11) of the collector plate 11. The collector plate 11 is a metal foil made of, for example, nickel and has a rectangular shape in a plan view as illustrated in FIG. 2. The thickness of the collector plate 11 is, for example, about 0.1 μm to 1000 μm. As the positive electrode activating material constituting the positive electrode layer 13, nickel hydroxide and the like may be exemplified. As the negative electrode activating material constituting the negative electrode layer 15, a hydrogen storage alloy and the like may be exemplified.

As illustrated in FIG. 2, a peripheral edge 11c of the collector plate 11 is an uncoated area which is not coated with the positive electrode activating material and the negative electrode activating material. The formation region of the negative electrode layer 15 on the other surface 11b of the collector plate 11 may be slightly larger than the formation region of the positive electrode layer 13 on the one surface 11a of the collector plate 11. On the peripheral edge 11c of the collector plate 11, incisions 11e continuous from an outer periphery 11d are formed. In this embodiment, the incisions 11e are formed at the four corners of the collector plate 11. The incision 11e is formed from the vertex of the corner to the position inside the uncoated area and does not reach the negative electrode layer 15.

The plurality of bipolar electrodes 10 are stacked via separators 17. In a state where the plurality of bipolar electrodes 10 are stacked, the positive electrode layer 13 of one bipolar electrode 10 faces the negative electrode layer 15 of one bipolar electrode 10 adjacent in the stacking direction with the separator 17 being interposed, and the negative electrode layer 15 of one bipolar electrode 10 faces the positive electrode layer 13 of the other bipolar electrode 10 adjacent in the stacking direction with the separator 17 being interposed. In this embodiment, the negative electrode layer 15 provided on the other surface 11b of each bipolar electrode 10 is covered with the sheet-shaped separator 17. Therefore, by stacking the plurality of bipolar electrodes 10 in the same direction with respect to the stacking direction, the separator 17 is arranged between the positive electrode layer 13 and the negative electrode layer 15 of the adjacent bipolar electrodes 10.

As a material constituting the separator 17, a porous film made of a polyolefin resin such as polyethylene (PE) or polypropylene (PP), a woven or nonwoven fabric made of polypropylene, polyethylene terephthalate (PET), methyl cellulose, or the like, and the like are exemplified. In addition, the separator 17 may be reinforced with a vinylidene fluoride resin compound.

A collector plate 18 provided with only the positive electrode layer 13 is stacked on one surface of one stacked end (stacked end on the upper side in FIG. 1) of the stacked bipolar electrodes 10. The positive electrode layer 13 of the collector plate 18 faces the negative electrode layer 15 of the bipolar electrode 10 as the uppermost layer via the separator 17. In addition, a collector plate 19 provided with only the negative electrode layer 15 is stacked on the other stacked end (stacked end on the lower side in FIG. 1) of the stacked bipolar electrodes 10. The negative electrode layer 15 is covered with the separator 17. The negative electrode layer 15 of the collector plate 19 faces the positive electrode layer 13 of the bipolar electrode 10 as the lowermost layer via the separator 17. Similarly to the collector plate 11, the collector plates 18 and 19 are metal foils made of, for example, nickel and have a rectangular shape in a plan view.

The peripheral edge 11e of the collector plate 11 is retained by the frame 20 in a state of being buried in the inner wall of the frame 20. Therefore, a space partitioned by the collector plates 11 and 11 and the inner wall of the frame 20 is formed between the collector plates 11 and 11 adjacent to each other in the stacking direction. This space contains an electrolytic solution (not illustrated) made of an alkaline solution such as a potassium hydroxide aqueous solution.

Similarly to the collector plate 11 of the bipolar electrode 10, peripheral edges 18c and 19c of the collector plates 18 and 19 are retained by the frame 20 in a state of being buried in the inner wall of the frame 20. In addition, the collector plates 18 and 19 may be formed to be thicker than the collector plate 11 of the bipolar electrode 10.

The frame 20 is formed by a plurality of spacers 21 and a resin frame 25 and has a rectangular tubular shape. In this embodiment, the inner wall of the frame 20 is formed by the plurality of spacers 21, and the outer wall of the frame 20 is formed by the resin frame 25.

The spacer 21 is formed with an insulating resin and has a rectangular frame shape. An inner periphery 21a of the spacer 21 is located inside the outer periphery 11d of the collector plate 11 of the bipolar electrode 10, and an outer periphery 21b of the spacer 21 is located outside the outer periphery 11d of the collector plate 11. The spacer 21 has a predetermined thickness in the stacking direction of the bipolar electrodes 10. The thickness of the spacer 21 is substantially equal to a sum of the thickness of the bipolar electrode 10 and the thickness of the separator and is, for example, 0.1 to 0.5 mm. The spacer 21 retains the peripheral edge 11c of the collector plate 11 of the bipolar electrode 10. That is, the outer periphery 11d of the collector plate 11 is arranged in the spacer 21. In this embodiment, the peripheral edge 11c of the collector plate 11 is arranged at the center of the spacer 21 in the thickness direction. For example, the peripheral edge 11c of the collector plate 11 and the spacer 21 are bonded by thermocompression-bonding or the like. In a state where the plurality of bipolar electrodes 10 are stacked, the plurality of spacers 21 are also stacked. In this state, a portion (the portion facing the other bipolar electrode 10 side) of the spacer 21 retaining one bipolar electrode 10 and a portion (the portion facing one bipolar electrode 10 side) of the spacer 21 retaining the other bipolar electrode 10 are arranged between the bipolar electrodes 10 and 10 adjacent to each other in the stacking direction.

Similarly to the collector plate 11 of the bipolar electrode 10, the peripheral edges 18c and 19c of the collector plates 18 and 19 are retained by the spacer 21. A portion of the spacer 21 that retains the collector plate 18 and a portion of the spacer 21 that retains the collector plate 11 are arranged between the collector plate 18 and the collector plate 11 adjacent to the collector plate 18. A portion of the spacer 21 that retains the collector plate 19 and a portion of the spacer 21 that retains the bipolar electrode 10 are arranged between the collector plate 19 and the collector plate 11 adjacent to the collector plate 19.

The resin frame 25 has a rectangular tubular shape and collectively coven the outer peripheries of the plurality of spacers 21. The plurality of spacers 21 and the resin frame 25 are integrated by welding or the like, for example. The resin constituting the resin frame 25 may be the same as the resin constituting the spacer 21. As such a resin, polypropylene (PP), polyphenylene sulfide (PPS), modified polyphenylene ether (modified PPE), and the like may be exemplified.

The pair of restraining plates 30A and 30B restrain the plurality of bipolar electrodes 10 and the collector plates 18 and 19 in the stacking direction. In addition the pair of restraining plates 30A and 30B also restrain the frame 20. A positive electrode terminal 33 is connected to one restraining plate 30A. A negative electrode terminal 35 is connected to the other restraining plate 30B. It is possible to perform charging and discharging the electricity storage device 1 by the positive electrode terminal 33 and the negative electrode terminal 35.

The restraining plates 30A and 30B are provided with through holes 37 for penetrating bolts 36 extending in the stacking direction. The bolt 36 is inserted from the restraining plate 30A toward the restraining plate 30B. A nut 38 is screwed to the distal end of the bolt 36. Therefore, the restraining plate 30A and the restraining plate 30B apply a restraining load to the plurality of bipolar electrodes 10 including the separator 17, the collector plate 18, the collector plate 19, and the frame 20. As a result, the interior of the frame 20 is sealed.

Hereinafter, a method for manufacturing, the above-described electricity storage device 1 will be described.

The method for manufacturing the electricity storage device 1 according to this embodiment includes a first process of fixing the spacers 21 to the peripheral edges 11c of the collector plates 11 in the bipolar electrodes 10, a second process of stacking the plurality of bipolar electrodes 10 to which the spacers 21 are fixed, and a third process of forming the resin frame 25 on the outer sides of the spacers 21 fixed to the stacked bipolar electrodes 10.

FIG. 3 is a view illustrating the first process. In the first process, the separator 17 is fixed to the bipolar electrode 10 including the collector plate 11, the positive electrode layer 13, and the negative electrode layer 15. Then, the spacer 21 is fixed to the peripheral edge 11c of the collector plate 11 in the bipolar electrode 10. As illustrated in a portion (a) of FIG. 3, in this embodiment, a half spacer piece 22 having a rectangular frame-shape in which the spacer 21 is divided in the thickness direction is prepared. An inner periphery 22a of the half spacer piece 22 is located inside the outer periphery 11d of the collector plate 11 of the bipolar electrode 10, and an outer periphery 22b of the half spacer piece 22 is located outside the outer periphery 11d of the collector plate 11. The half spacer pieces 22 are arranged on the one surface 11a and the other surface 11b of the collector plate 11 of the bipolar electrode 10, respectively. The peripheral edge 11c of the collector plate 11 is interposed by the pair of half spacer pieces 22 and 22. Then, as illustrated in a portion (b) of FIG. 3, by pressurizing the pair of half spacer pieces 22 and 22 while heating, the collector plate 11 and the pair of half spacer pieces 22 and 22 are thermocompression-bonded, and the pair of half spacer pieces 22 and 22 are thermocompression-bonded to each other. Therefore, the bipolar electrode 10 is retained by the spacer 21.

Figure 4:
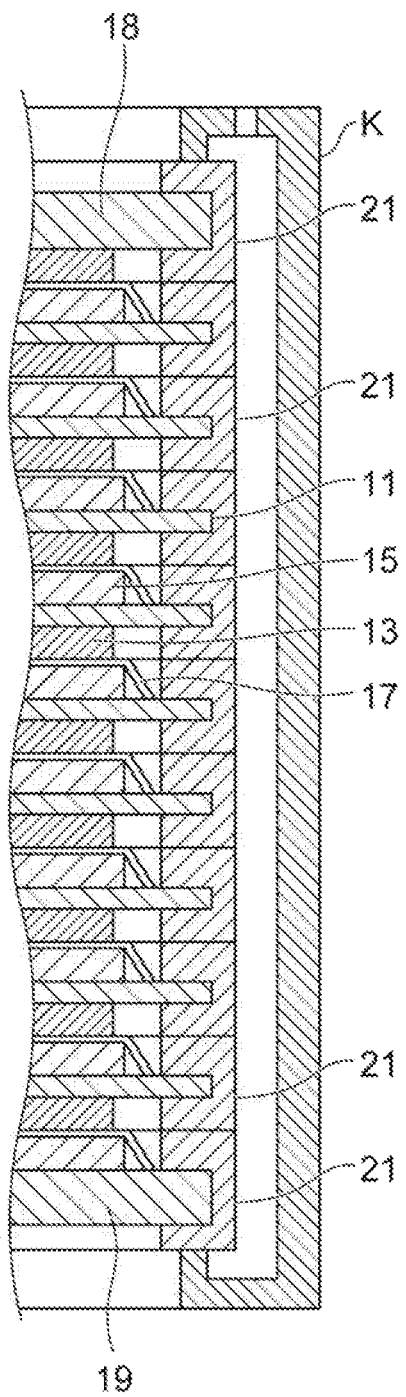
FIG. 4 is a view illustrating a manufacturing process of the electricity storage device.

FIG. 4 is a view illustrating the second process, and the third process. Subsequently, by the second process, the plurality of bipolar electrodes 10 to which the spacers 21 are fixed are stacked. In the second process, a predetermined number of the bipolar electrodes 10 to which the spacers 21 are fixed by the first process are stacked. In this case, the bipolar electrodes 10 are stacked so that the directions of the positive electrode layer 13 and the negative electrode layer 15 of all the bipolar electrodes 10 are the same. A collector plate 18 is arranged at the end portion of the stacked bipolar electrode 10 on the negative electrode layer 15 side. In addition, a collector plate 19 is arranged at the end portion of the stacked bipolar electrode 10 on the positive electrode layer 13 side. Similarly to the bipolar electrodes 10, the spacers 21 are fixed to the peripheral edges 18c and 19c of the collector plates 18 and 19.

In the subsequent third process, a resin frame 25 is formed on the outer side of the plurality of spacers 21 retaining the plurality of bipolar electrodes 10 and the collector plates 18 and 19 that are stacked. In the third process, the resin frame 25 is formed by injection molding. As illustrated in FIG. 4, a mold K is fixed to the outer peripheries of the stacked spacers 21, and a resin is injected into the mold K. In this embodiment, the outer peripheries 21b of the spacers 21 are exposed inside the mold K. For this reason, the resin injected into the mold K and the outer peripheries 21b of the spacers 21 are welded and integrated. Therefore, the resin frame 25 collectively covering the outer peripheries 21b of all the spacers 21 is formed. That is, the frame 20 is formed by the spacers 21 and the resin frame 25. Then, the electricity storage device 1 is formed by restraining the plurality of bipolar electrodes 10 indulging the separators 17, the collector plate 18, the collector plate 19, and the frame 20 by using the pair of restraining plates 30A and 30B.

In the above-described electricity storage device 1, the collector plates 11 are prevented from being in direct contact with each other by the plurality of spacers 21 arranged between the collector plates 11 adjacent to each other in the stacking direction, and thus, a short circuit is prevented. In addition, the outer peripheries 11d of a stacked plurality of collector plates 11 are formed in a liquid-tight manner by the resin frame 25 collectively covering the outer peripheries 21b of the plurality of spacers 21, and thus, leakage of an electrolytic solution is prevented. In the related art, it is necessary to strictly set the crushing amount of the sealing portion that insulates between the adjacent electrodes. However, in the above-described configuration, since it is not necessary to consider the crushing amount or the like, the accuracy requirement of each member is not increased. Therefore, it is possible to suppress the short circuit between the electrodes at low cost.

In addition, according to the method for manufacturing the electricity storage device 1 described above, the spacers 21 are fixed to the peripheral edges 11c of the collector plates 11, and after that, the bipolar electrodes 10 are stacked. As a result, the spacers 21 are arranged between the collector plates 11 adjacent to each other in the stacking direction. For example, when the injection molding is performed in order to form the resin frame 25 in a state where the spacers 21 are not arranged, there is a concern that the peripheral edges 11c of the adjacent collector plates 11 are moved by the injected resin. In this case, there is a concern that the moved peripheral edges 11c are in contact with each other. In addition, there is a concern that the injected resin may flow and may reach the positive electrode layer 13 or the negative electrode layer 15. In this embodiment, by arranging the spacers 21 in advance before the resin injection, contact between the collector plates 11 is suppressed. In addition, the spacers 21 prevent the resin from proceeding to the positive electrode layer 13 side and the negative electrode layer 15 side. In addition, since the resin frame 25 is formed by injection molding, the resin frame 25 can be easily manufactured. Therefore, it is possible to suppress a short circuit between the electrodes at low cost.

In addition, since the spacer 21 and the resin frame 25 are formed with the same material, in the process of forming the resin frame 25 by injection molding, the spacer 21 and the resin frame 25 are integrated by welding. Therefore, it is possible to more effectively suppress leakage of an electrolytic solution.

In addition, the outer periphery 11d of the collector plate 11 is arranged in the spacer 21. According to such a configuration, it is possible to bond the spacer 21 and the collector plate 11 in a liquid-tight manner.

In addition, incisions 11e continuous from the outer periphery 11d are formed on the peripheral edge 11c of the collector plate 11. In the embodiment, the incisions 11e are formed at four corners of the collector plate 11 having a rectangular shape. Therefore, the peripheral edge 11c of the collector plate 11 is divided into four portions corresponding to the sides, and the four portions move independently of each other. Therefore, occurrence of wrinkles, twists, or the like on the collector plate 11 is suppressed at the time of attaching the spacer 21 or the like.

Second Embodiment

An electricity storage device according to this embodiment is mainly different from the electricity storage device 1 according to the first embodiment in terms of the shape of the spacer. Hereinafter, differences from the first embodiment will be mainly described, and the same elements and members are denoted by the same reference numerals, and detailed description thereof will be omitted.

Figure 5:
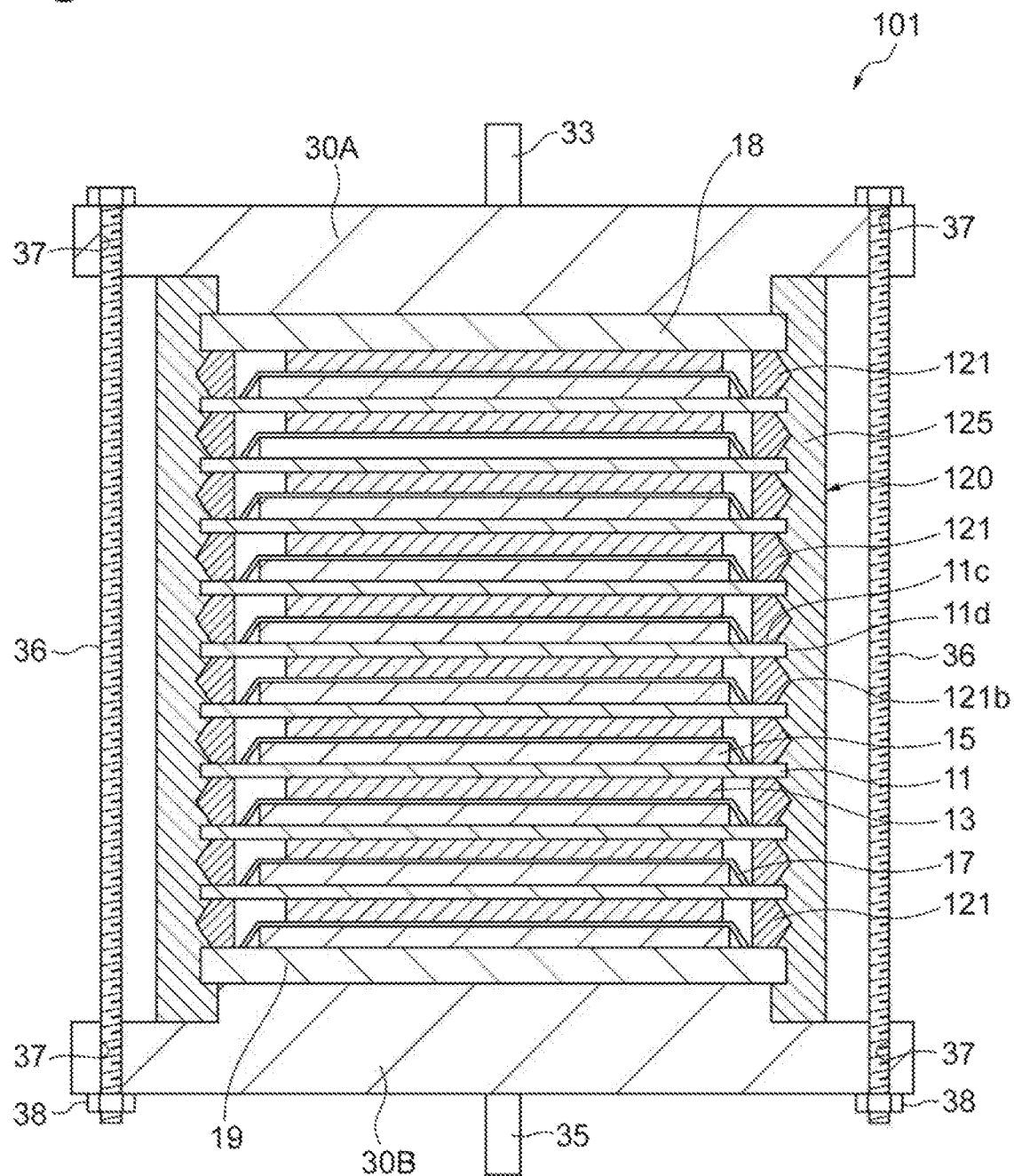
FIG. 5 is a cross-sectional view schematically illustrating an electricity storage device according to a second embodiment.

FIG. 5 is a cross-sectional view schematically illustrating the electricity storage device according to this embodiment. As illustrated in FIG. 5, an electricity storage device 101 includes a plurality of bipolar electrodes 10, a frame 120 and a pair of restraining plates 30A and 30B.

The frame 120 is formed by a plurality of spacers 121 and a resin frame 125 and has a rectangular tubular shape. The spacer 121 is formed with an insulating resin and has a rectangular frame shape. The spacer 121 has a predetermined thickness in the stacking direction of the bipolar electrode 10. Similarly to the first embodiment, the thickness of the spacer 121 is substantially equal to the thickness of the bipolar electrode 10. The center of the outer periphery 121b of the spacer 121 in the thickness direction has a convex shape toward the resin frame 125. In the illustrated example, the outer periphery 121b of the spacer 121 is inclined so as to protrude to the resin frame 125 side at the center in the thickness direction. The distal end of the outer periphery 121b of the spacer 121 extends to a position outside the outer periphery 11d of the collector plate 11.

The spacer 121 is arranged between the bipolar electrodes 10 adjacent to each other in the stacking direction. In addition, the spacer 121 is arranged on the peripheral edge 11c of the collector plate 11 of the bipolar electrode 10. That is, the peripheral edge 11c of the collector plate 11 is interposed by a pair of the spacers 121 and 121 arranged on one side and the other side in the stacking direction. In addition, as illustrated in the drawing, the outer periphery 11d of the collector plate 11 is not interposed by the spacers 121 but extends to the resin frame 125 side. In addition, the spacers 121 are also arranged between the collector plate 18 and the bipolar electrode 10 and between the collector plate 19 and the bipolar electrode 10.

The resin frame 125 has a rectangular tubular shape and collectively covers the outer peripheries 121b of the plurality of spacers 121. The plurality of spacers 121 and the resin frame 125 are integrated by, for example, welding or the like. The outer peripheries 11d of the collector plates 11 in the bipolar electrode 10 are buried in the resin frame 125. In addition, the outer peripheries of the collector plates 18 and 19 are also buried in the resin frame 125. The resin constituting the resin frame 125 may be the same as or different from the resin constituting the spacer 121. As such a resin, polypropylene (PP), polyphenylene sulfide (PPS), modified polyphenylene ether (modified PPE), and the like may be exemplified.

Similarly to the resin frame 25 of the first embodiment, the resin frame 125 can be formed by injection molding. Therefore, the inner peripheral surface of the resin frame 125 has a concave shape corresponding to the convex shape of the outer periphery 121b of the spacer 121. The electricity storage device 101 is manufactured by restraining the plurality of bipolar electrodes 110 including the separators 17, the collector plate 18, the collector plate 19, and the frame 120 by using the restraining plates 30A and 30B.

In such an electricity storage device 101, similarly to the electricity storage device 1 of the first embodiment, the collector plates 11 are suppressed from being in direct contact with each other by the plurality of spacers 121 arranged between the collector plates 11 adjacent to each other in the stacking direction. In addition, the outer peripheries 11d of the stacked plurality of collector plates 11 are formed in a liquid-tight manner by the resin frame 125 collectively coveting the outer peripheries 121b of the plurality of spacers 121, and thus, leakage of an electrolytic solution is prevented. In particular, since the outer peripheries 11d of the collector plates 11 are arranged in the resin frame 125, it is possible to more reliably bond the resin frame 125 and the collector plates 11 in a liquid-tight manner.

In addition, the outer periphery 121b of the spacer 121 protrudes toward the resin frame 125. In addition, the distal end of the outer periphery 121b of the spacer 121 extends to a position outside the outer periphery 11d of the collector plate 11. With such a configuration, it is possible to reliably prevent the collector plates 11 and 11 adjacent to each other from being in contact with each other.

In addition, since the inner peripheral surface of the resin frame 125 has a concave shape corresponding to the convex shape of the outer periphery 121b of the spacer 121, it is possible to easily allow the spacer 121 and the resin frame 125 to be in close contact with each other.

In addition, even in a case where the spacer 121 and the resin frame 125 are formed with different materials, since the outer peripheries 11d of the collector plates 11 are buried in the resin frame 125, it is possible to suppress leakage of an electrolytic solution and the like.

The embodiments of the present invention have been described above in detail with reference to the drawings, but the specific configuration is not limited to the embodiments. For example, in the first embodiment, the example in which the peripheral edge 11c of the collector plate 11 is retained in the spacer 21 is disclosed, but the present invention is not limited thereto. For example, the spacers may be welded only to one surface of the collector plate to form a unit, and then, the units are stacked.

Third Embodiment

Figure 6:
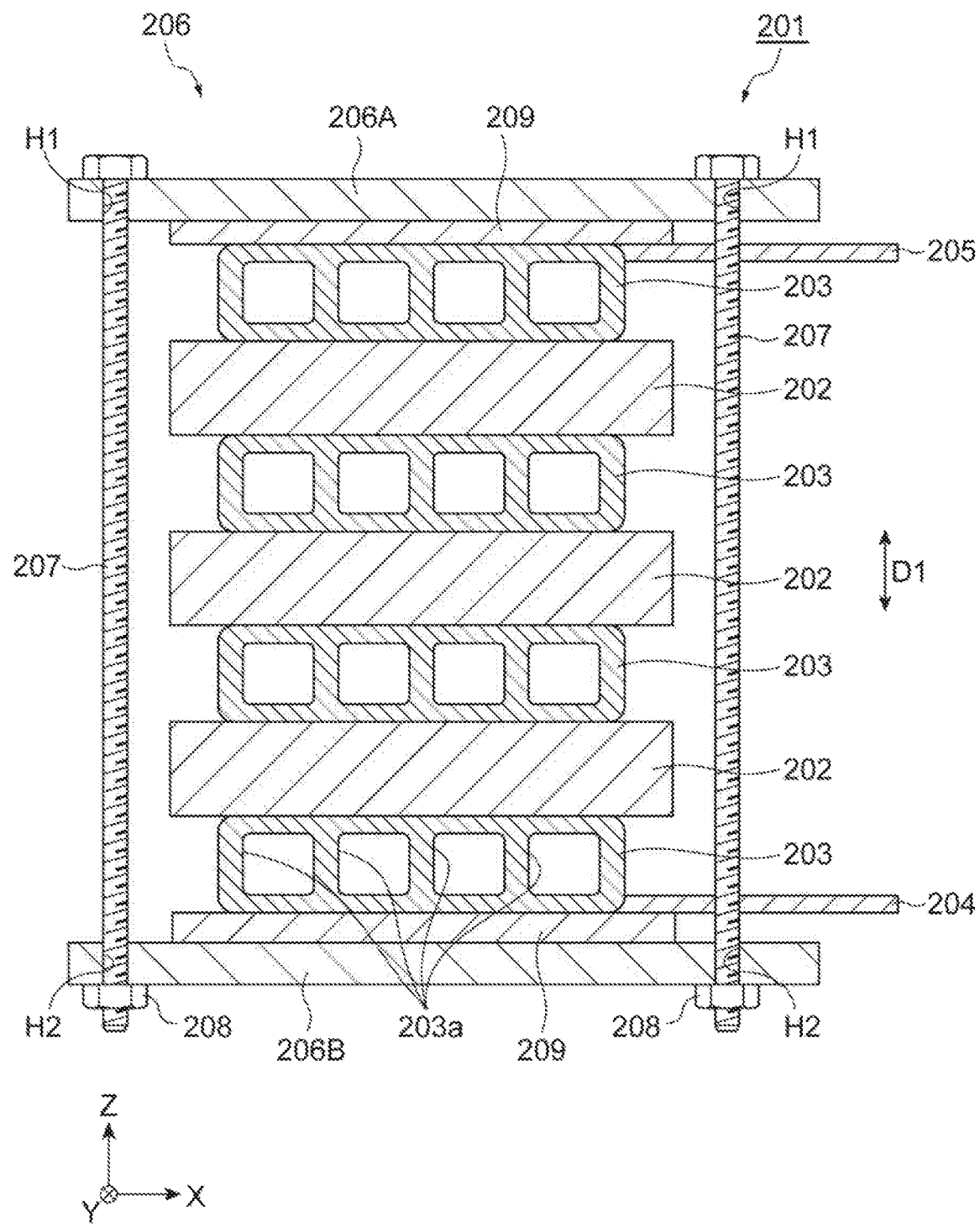
FIG. 6 is a cross-sectional view schematically illustrating an electricity storage device according to a third embodiment.

An electricity storage device 201 according to a third embodiment will be described with reference to FIGS. 6 to 10. The electricity storage device 201 illustrated in FIG. 6 is used as a battery of various vehicles such as a forklift, a hybrid vehicle, and an electric vehicle. The electricity storage device 201 includes a plurality of (three in this embodiment) electricity storage modules 202, but the electricity storage device 201 may have a single electricity storage module 202. The electricity storage module 202 is a bipolar battery. The electricity storage module 202 is, for example, a secondary battery such as a nickel hydrogen secondary battery or a lithium ion secondary battery, but the electricity storage module 202 may be an electric double layer capacitor. In the following description, a nickel hydrogen secondary battery will be exemplified.

A plurality of electricity storage modules 202 can be stacked via a conductive plate 203 such as a metal plate. When viewed from a stacking direction D1 (Z direction) of the electricity storage module 202, the electricity storage module 202 and the conductive plate 203 have, for example, a rectangular shape. The conductive plate 203 is also arranged on the outer sides of the electricity storage modules 202 located at both ends in the stacking direction D1. The conductive plate 203 is electrically connected to the adjacent electricity storage modules 202. Therefore, the plurality of electricity storage modules 202 are connected in series in the stacking direction D1. In the stacking direction D1, a positive electrode terminal 204 is connected to the conductive plate 203 located at one end. A negative electrode terminal 205 is connected to the conductive plate 203 located at the other end. The positive electrode terminal 204 may be integrated with the conductive plate 203 to be connected. The negative electrode terminal 205 may be integrated with the conductive plate 203 to be connected. The positive electrode terminal 204 and the negative electrode terminal 205 extend in a direction (X direction) intersecting the stacking direction D1. It is possible to perform charging and discharging of the electricity storage device 201 by the positive electrode terminal 204 and the negative electrode terminal 205.

The conductive plate 203 can also function as a heat releasing plate for releasing the heat generated in the electricity storage module 202. A refrigerant such as air passes through a plurality of gaps 203a provided inside the conductive plate 203, so that it is possible to efficiently release the heat from the electricity storage module 202 to the outside. Each of the gaps 203a extends in, for example, a direction (Y direction) intersecting the stacking direction D1. When viewed from the stacking direction D1, the conductive plate 203 is smaller than the electricity storage module 202, but the conductive plate 203 may be equal to or larger than the electricity storage module 202.

The electricity storage device 201 can include a restraining member 206 that restrains the alternately stacked electricity storage modules 202 and conductive plates 203 in the stacking direction D1. The restraining member 206 includes a pair of restraining plates 206A and 206B and connection members (bolt 207 and nut 208) for connecting the restraining plates 206A and 206B to each other. An insulating film 209 such as a resin film is arranged between each of the restraining plates 206A and 206B and the conductive plate 203. Each of the restraining plates 206A and 206B is formed with, for example, a metal such as iron. When viewed from the stacking direction D1, each of the restraining plates 206A and 206B and the insulating film 209 has, for example, a rectangular shape. The insulating film 209 is larger than the conductive plate 203. The restraining plates 206A and 206B are larger than the electricity storage module 202. When viewed from the stacking direction D1, an insertion hole H1 into which a shaft portion of the bolt 207 is inserted is provided on the edge portion of the restraining plate 206A at a position outside the electricity storage module 202. Similarly, when viewed from the stacking direction D1, an insertion hole H2 into which the shaft portion of the bolt 207 is inserted is provided on the edge portion of the restraining plate 206B at a position outside the electricity storage module 202. In a case where each of the restraining plates 206A and 206B has a rectangular shape when viewed from the stacking direction D1, the insertion hole H1 and the insertion hole H2 are located at corners of the restraining plates 206A and 206B.

One restraining plate 206A is abutted against the conductive plate 203 connected to the negative electrode terminal 205 via the insulating film 209. The other restraining plate 206B is abutted against the conductive plate 203 connected to the positive electrode terminal 204 via the insulating film 209. For example, the bolt 207 is passed through the insertion hole H1 and the insertion hole H2 from one restraining plate 206A side to the other restraining plate 206B side. The nut 208 is threadedly engaged with the distal end of the bolt 207 protruding from the other restraining plate 206B. Therefore, the insulating film 209, the conductive plate 203, and the electricity storage module 202 are held and unitized, and a restraining load is applied in the stacking direction D1.

Figure 7:
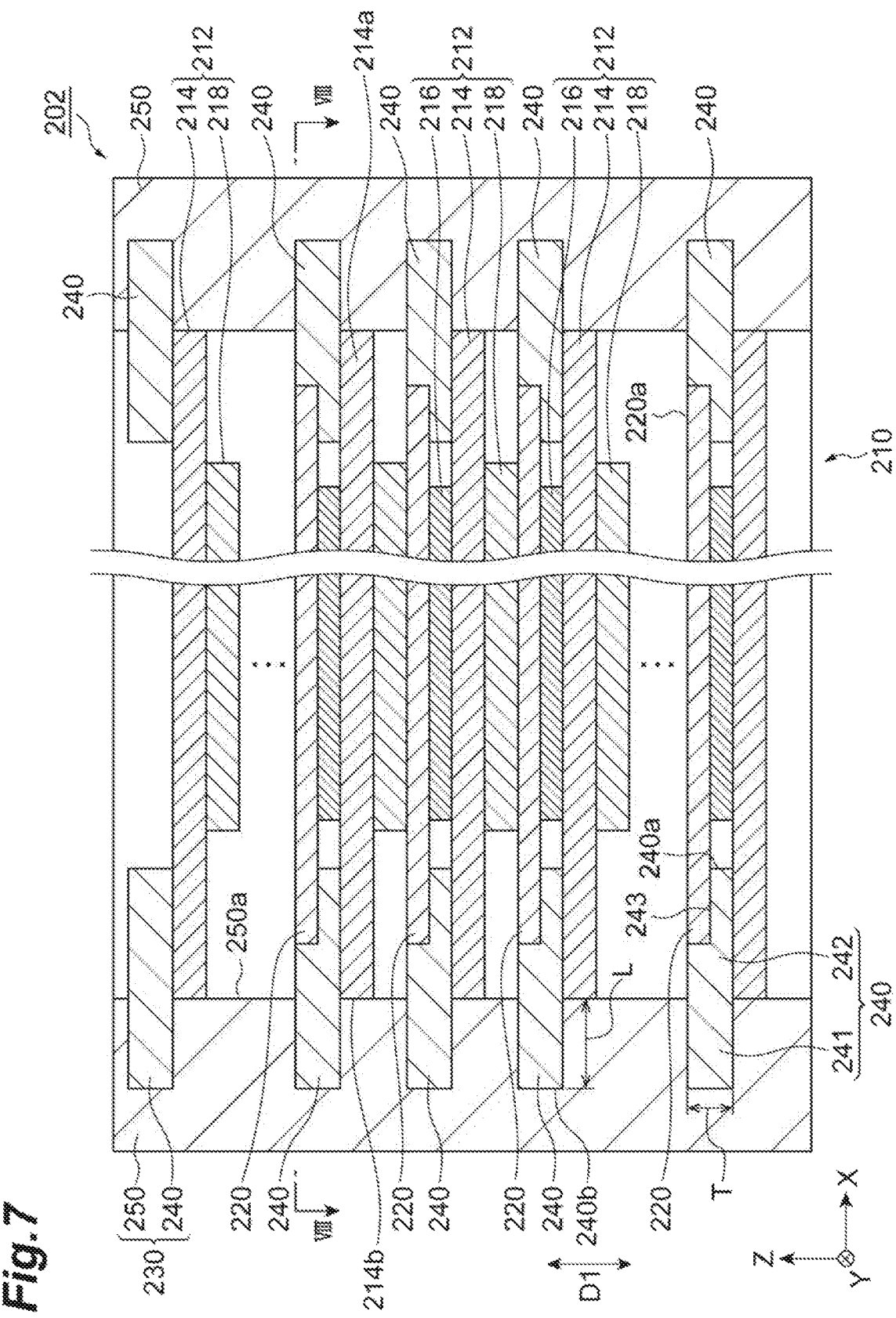
FIG. 7 is a cross-sectional view schematically illustrating an electricity storage module constituting the electricity storage device of FIG. 6.
Figure 8:
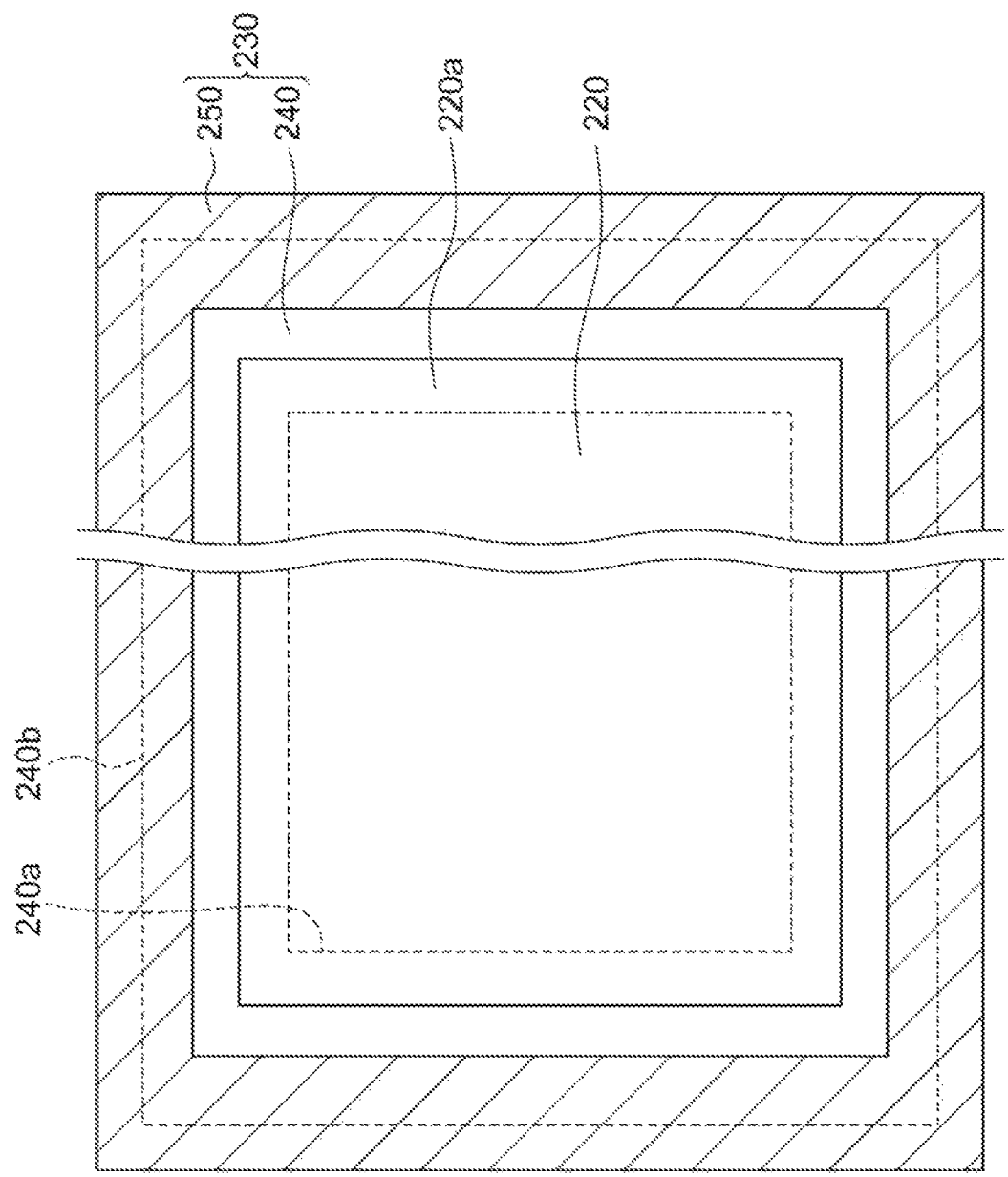
FIG. 8 is a cross-sectional view taken along line VIII-VIII of FIG. 7.

FIG. 7 is a cross-sectional view schematically illustrating the electricity storage module 202 constituting the electricity storage device 201. FIG. 8 is a cross-sectional view taken along line VIII-VIII of FIG. 7. As illustrated in FIG. 7, the electricity storage module 202 includes a stacked body 210 in which a plurality of bipolar electrodes (electrodes) 212 are stacked. When viewed from the stacking direction D1 of the bipolar electrodes 212, the stacked body 210 has, for example, a rectangular shape. A separator 220 can be arranged between the adjacent bipolar electrodes 212.

The bipolar electrode 212 includes an electrode plate 214 (collector plate), a positive electrode 216 (positive electrode layer) provided on one surface of the electrode plate 214, and a negative electrode 218 (negative electrode layer) provided on the other surface of the electrode plate 214. In the stacked body 210, the positive electrode 216 of a bipolar electrode 212 faces the negative electrode 218 of one bipolar electrode 212 adjacent in the stacking direction D1 with the separator 220 being interposed, and the negative electrode 218 of the bipolar electrode 212 faces the positive electrode 216 of the other bipolar electrode 212 adjacent in the stacking direction D1 with the separator 220 being interposed.

In the stacking direction D1, the electrode plate 214 (negative electrode side terminating electrode) having the negative electrode 218 arranged on the inner side thereof is arranged at one end of the stacked body 210. The electrode plate 214 (positive electrode side terminating electrode) having the positive electrode 216 arranged on the inner side thereof is arranged at the other end of the stacked body 210. The negative electrode 218 of the negative electrode side terminating electrode faces the positive electrode 216 of the bipolar electrode 212 of the uppermost layer via the separator 220. The positive electrode 216 of the positive electrode side terminating electrode faces the negative electrode 218 of the bipolar electrode 212 of the lowermost layer via the separator 220. The electrode plates 214 of the terminating electrodes are connected to the adjacent conductive plates 203 (refer to FIG. 6).

The electricity storage module 202 includes a frame 230 that surrounds the side surface of the stacked body 210 extending in the stacking direction D1. The frame 230 can include a first sealing portion 240 (spacer) bonded to the peripheral edge portion 214a of the electrode plate 214 and a second sealing portion 250 (resin frame) provided around the first sealing portion 240 when viewed from the stacking direction D1.

One first sealing portion 240 is provided for each bipolar electrode 212. The first sealing portion 240 is formed in a frame shape (a rectangular frame shape in this embodiment) when viewed from the stacking direction D1, and is provided over the entire circumference of the peripheral edge portion of the electrode plate 214. The first sealing portion 240 includes a first portion 241 overlapping with the second sealing portion 250 when viewed from the stacking direction D1 and a second portion 242 extending inward from the second sealing portion 250 when viewed from the stacking direction D1.

The first portion 241 is a portion of the first sealing portion 240 on the outer peripheral side and is provided to be continuous from the outer side of the second portion 242. The first portion 241 is buried in the second sealing portion 250 to be bonded to the second sealing portion 250. The space between the first portions 241 adjacent to each other in the stacking direction D1 is filled with the second sealing portion 250. As will be described later, the first portion 241 and the second sealing portion 250 are bonded by, for example, injection molding or hot plate welding. The length L of the first portion 241 is larger than or equal to the thickness T of the first portion 241 in the stacking direction D1 (L≥T). Herein, the length L of the first portion 241 corresponds to the protrusion amount of the first sealing portion 240 from the side end portion 214b (the end surface facing the direction intersecting the stacking direction D1) of the electrode plate 214.

The second portion 242 is a portion on the inner peripheral side of the first sealing portion 240. The second portion 242 is bonded to the electrode plate 214. As illustrated in FIG. 7, in this embodiment, one surface of the second portion 242 in the stacking direction D1 and the edge portion of the side surface of the electrode plate 214 on the side where the positive electrode 216 is provided are bonded by, for example, welding. In addition, the second portion 242 is formed so as not to overlap with any of the positive electrode 216 and the negative electrode 218 when viewed from the stacking direction D1. That is, when viewed from the stacking direction D1, the width of the second portion 242 in the direction perpendicular to the stacking direction D1 is adjusted so that a gap is formed between the inner surface 240a (that is, the inner surface of the second portion 242) of the first sealing portion 240 and each of the positive electrode 216 and the negative electrode 218.

The second portion 242 has a portion overlapping with the separator 220 when viewed from the stacking direction D1. In this embodiment, a step portion 243 having a smaller thickness in the stacking direction D1 than the other portion of the first sealing portion 240 is formed in the inner portion of the second portion 242. The step portion 243 is provided on the other surface (the surface opposite to the surface bonded to the electrode plate 214) of the second portion 242 in the stacking direction D1. A peripheral edge portion 220a of the separator 220 is arranged in the step portion 243. That is, in this embodiment, the step portion 243 corresponds to the above-described portion overlapping with the separator 220.

In addition, in FIG. 7, the height (length in the stacking direction D1) of the step portion 243 is set to be equal to the height of the separator 220. However, the height of the step portion 243 may be larger than the height of the separator 220 or may be smaller than the height of the separator 220. In addition, it is not necessary to provide the step portion 243 in the second portion 242, and the separator 220 may be arranged so as to overlap with at least a portion of the second portion 242. In addition, in FIG. 7, the first sealing portion 240 bonded to one electrode plate 214 and the other electrode plate 214 adjacent to the one electrode plate 214 on the side of the positive electrode 216 of the one electrode plate 214 with the separator 22 being interposed are separated from each other. However, the thickness T of the first sealing portion 240 may be set so that the first sealing portion 240 and the other electrode plate 214 are in contact with each other.

The second sealing portion 250 is a tubular member extending in the stacking direction D1 as an axial direction. The second sealing portion 250 is formed in a rectangular frame shape when viewed from the stacking direction D1 (refer to FIG. 8). The second sealing portion 250 extends over the entire length of the stacked body 210 in the stacking direction D1 (refer to FIG. 7). The first portions 241 of the plurality of first sealing portions 240 arranged in the stacking direction D1 are buried in the second sealing portion 250. The inner surface 250a of the second sealing portion 250 is in contact with the side end portion 214b of the electrode plate 214. An internal space air-tightly partitioned by the electrode plates 214 and 214, the first sealing portion 240, and the second sealing portion 250 is formed between the electrode plates 214 and 214 adjacent to each other in the stacking direction D1. The internal space contains an electrolytic solution (not illustrated) made of, for example, an alkaline solution such as a potassium hydroxide aqueous solution.

The electrode plate 214 is a rectangular metal foil made of, for example, nickel. The peripheral edge portion 214a including the side end portion 214b of the electrode plate 214 is an uncoated area which is not coated with the positive electrode activating material and the negative electrode activating material. As the positive electrode activating material constituting the positive electrode 216, for example, nickel hydroxide may be exemplified. As the negative electrode activating material constituting the negative electrode 218, for example, a hydrogen storage alloy may be exemplified. The formation region of the negative electrode 218 on the other surface of the electrode plate 214 is slightly larger than the formation region of the positive electrode 216 on one surface of the electrode plate 214.

The separator 220 is formed, for example, in a sheet shape. The separator 220 has, for example, a rectangular shape. The separator 220 is made of a porous resin. The separator 220 is made of, for example, a nonwoven fabric which is a kind of a porous resin. As a material constituting the separator 220, a porous film made of a polyolefin resin such as polyethylene (PE) or polypropylene (PP), a woven or nonwoven fabric made of polypropylene or the like, and the like are exemplified. In addition, the separator 220 may be reinforced with a vinylidene fluoride resin compound or the like. In addition, the separator 220 is not limited to a sheet shape, and a bag-shaped separator may be used.

As a resin material constituting the frame 230 (the first sealing portion 240 and the second sealing portion 250), for example, polypropylene (PP), polyphenylene sulfide (PPS), modified polyphenylene ether (modified PPE), or the like may be exemplified.

Next, a method for manufacturing the electricity storage device 201 (mainly the electricity storage module 202) will be described. The method for manufacturing the electricity storage device 201 according to this embodiment includes a first process of fixing the second portions 242 of the first sealing portions 240 to the peripheral edge portions 214a of the electrode plates 214 in the bipolar electrodes 212, a second process of stacking a plurality of bipolar electrodes 212 to which the first sealing portions 240 are fixed, and a third process of forming the second sealing portion 250 on the outer sides of the first sealing portions 240 fixed to the stacked bipolar electrodes 212.

In the first process, the second portions 242 of the first scaling portions 240 are fixed to the peripheral edge portions 214a of the electrode plates 214 provided with the positive electrode 216 and the negative electrode 218 by welding or the like. Then, the peripheral edge portion 220a of the separator 220 is arranged on the step portion 243 provided in the second portion 242.

In the second process, the plurality of bipolar electrodes 212 to which the first sealing portions 240 are fixed by the first process are stacked. Therefore, the stacked body 210 (refer to FIG. 7) is formed. When the second process is completed, the second scaling portion 250 is not formed.

In the third process, the second sealing portion 250 is formed so that the first portion 241 (that is, the portion protruding outward from the side end portion 214b of the electrode plate 214 when viewed from the stacking direction D1) of the first scaling portion 240 is buried in the second sealing portion 250. The second sealing portion 250 may be formed by injection molding similar to the method described in the first embodiment (refer to FIG. 4). Alternatively, the second sealing portion 250 may be formed by hot plate welding to the first portion 241 of the first sealing portion 240.

Figure 9:
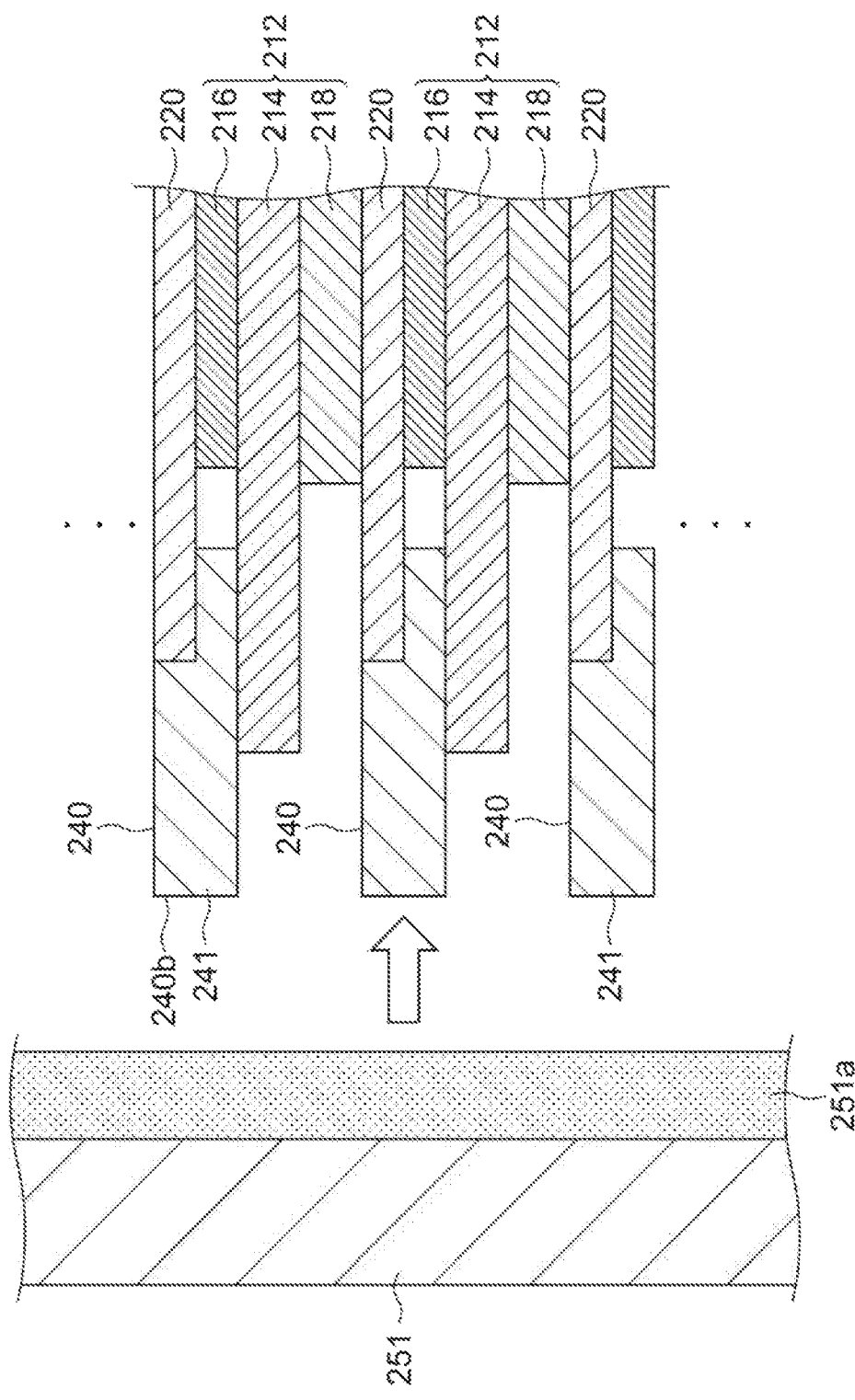
FIG. 9 is a view illustrating hot plate welding of a second sealing portion to a first sealing portion.

FIG. 9 is a view illustrating the hot plate welding of the second sealing portion 250 to the first sealing portion 240. Herein, as an example, the second sealing portion 250 formed in a rectangular frame shape when viewed from the stacking direction D1 is divided into four plate-shaped members 251 corresponding to respective sides of the rectangular frame viewed from the stacking direction D1. Then, one plate-shaped member 251 is welded to a portion corresponding to one side of the first sealing portion 240 formed in a rectangular frame shape when viewed from the stacking direction D1 by hot plate welding. Specifically, as illustrated in FIG. 9, the melted portion 251a of the plate-shaped member 251 melted by heating the surface is pressed against the first portion 241 of the first sealing portion 240 in a direction facing the outer surface 240b of the first sealing portion 240. Thus, the first portion 241 is welded to the plate-shaped member 251 so as to be buried in the melted portion 251a. Such hot plate welding is performed for each of the four sides of the first sealing portion 240. Therefore, the four plate-shaped members 251 are welded to the first portion 241 and are formed in a rectangular frame shape so as to surround the periphery of the stacked body 210. In the first sealing portion 240, a protrusion amount (that is, the length L of the first portion 241) of the first sealing portion 240 from the side end portion 214b of the electrode plate 214 is secured to be equal to or larger than a certain value (L≥T), so that the above-described hot plate welding work is facilitated. Finally, by bonding the end portions of the adjacent plate-shaped members 251 by welding or the like, the second sealing portion 250 is formed. However, the procedure for forming the second sealing portion 250 by hot plate welding is not limited to the above-described procedure. For example, the second sealing portion 250 may be divided into two plate-shaped members formed in an L shape so as to correspond to two adjacent sides of a rectangular frame viewed from the stacking direction D1. In this case, the respective plate-shaped members formed in an L shape are welded to portions corresponding to the two adjacent sides of the first sealing portion 240 by hot plate welding, and the end portions of the plate-shaped members are bonded to each other by welding or the like, so that the second sealing portion 250 can be formed.

By the first to third processes described above, one electricity storage module 202 (refer to FIG. 7) is formed. A plurality of (three in this embodiment) electricity storage modules 202 are prepared by the same processes. After that, as illustrated in FIG. 6, the electricity storage device 201 is manufactured by restraining the electricity storage modules 202, the conductive plates 203, and the insulating films 209 by the restraining member 206.

In the electricity storage device 201 described above, the first sealing portion 240 (spacer) has a first portion 241 overlapping with the second sealing portion 250 (resin frame) when viewed from the stacking direction D1 and a second portion 242 extending inward from the second sealing portion 250 when viewed from the stacking direction D1. The first portion 241 is bonded to the second sealing portion 250. The second portion 242 is bonded to the electrode plate 214 (collector plate). According to such a configuration, since the rigidity of the electrode plate 214 can be improved by the second portion 242 bonded to the electrode plate 214, it is possible to suppress deformation of the electricity storage device 201 due to an external force such as an internal pressure.

In addition, the second portion 242 does not overlap with any of the positive electrode 216 (positive electrode layer) and the negative electrode 218 (negative electrode layer) when viewed from the stacking direction D1, and the second portion 242 has a portion which overlaps with the separator 220 when viewed from the stacking direction D1. In this embodiment, the second portion 242 has the step portion 243 as a portion overlapping with the separator 220. According to such a configuration, since the region where the first sealing portion 240 and the separator 220 overlap with each other can be appropriately secured, it is possible to effectively suppress a short circuit between the electrode plates 214 adjacent to each other in the stacking direction D1.

In addition, the first sealing portion 240 and the second sealing portion 250 may be formed with the same material. For example, in a case where the first sealing portion 240 and the second sealing portion 250 are integrated by welding (injection molding or hot plate welding or the like) as described above, it is preferable that the first sealing portion 240 and the second sealing portion 250 are formed with the same material.

In addition, the first sealing portion 240 is formed in a frame shape (a rectangular frame shape in this embodiment) when viewed from the stacking direction D1. With such a configuration, it is possible to simplify the shape of the first sealing portion 240.

In addition, a protrusion amount (that is, the length L of the first portion 241) of the first sealing portion 240 from the side end portion 214b (the end surface facing a direction intersecting the slacking direction D1) of the electrode plate 214 is equal to or larger than a thickness of the first sealing portion 240 in the stacking direction D1. According to such a configuration, it is possible to alleviate restrictions on a construction method at the time of forming the second sealing portion 250. As described above, it is easy to bond the second scaling portion 250 to the first sealing portion 240 by hot plate welding by using the protrusion portion (that is, the first portion 241) of the first sealing portion 240 having a protrusion amount (length L) equal to or larger than a predetermined value.

In addition, as described above, the second sealing portion 250 may be formed by injection molding or may be formed by hot plate welding to the first sealing portion 240. According to such a configuration, it is possible to form the peripheral edge of the stacked plurality of bipolar electrodes 212 in a liquid-tight manner by the second sealing portion 250 and it is possible to prevent leakage of an electrolytic solution.

Modified Example of Third Embodiment

Figure 10:
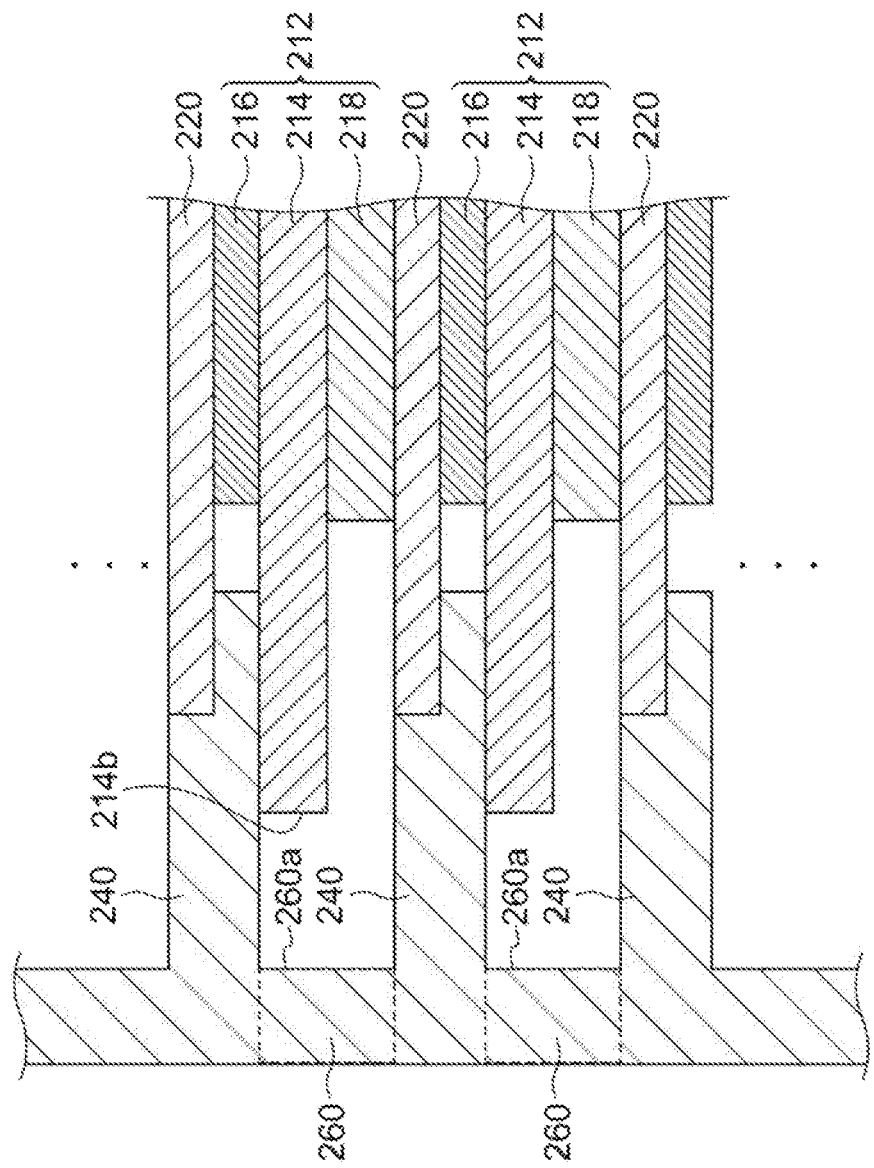
FIG. 10 is a view schematically illustrating an example of a connection portion.

In the third embodiment, the electricity storage module 202 may further include a connection portion 260 that connects end portions (peripheral edge portions) of the first sealing portions 240 adjacent to each other in the stacking direction D1. FIG. 10 is a view schematically illustrating an example of the connection portion 260 (portion surrounded by a broken line in FIG. 10). The connection portion 260 can be formed, for example, by forming melted portions by heating the outer surfaces 240b (refer to FIG. 9) of the adjacent first sealing portions 240 and bonding the melted portions formed in the respective adjacent first sealing portions 240. By forming such a connection portion 260, it is possible to suppress the warping of the peripheral edge portion of the first sealing portion 240 in the stacking direction D1, and thus, it is possible to effectively suppress the occurrence of stacking misalignment of the plurality of bipolar electrodes 212.

In the method for manufacturing the electricity storage device 201, in the case of forming the connection portion 260, a process of connecting the end portions of the first sealing portions 240 adjacent to each other in the stacking direction D1 is performed before the above-described third process. In this process, for example, the above-described heat treatment and bonding processing of melted portions are performed, so that the connection portion 260 is formed. According to such a configuration, the second sealing portion 250 can be formed in the third process in a state where warping of the peripheral edge portion of the first sealing portion 240 in the stacking direction D1 is suppressed. As a result, it is possible to effectively suppress occurrence of stacking misalignment of the plurality of bipolar electrodes 212.

In addition, the connection portion 260 connecting the adjacent first sealing portions 240 may not be provided over the entire circumference of the peripheral edge portion of the first sealing portion 240 but may be provided at a portion of the peripheral edge portion of the first sealing portions 240. For example, the connection portion 260 may be provided in a dot shape at certain intervals on the peripheral edge portion of the first sealing portion 240. In addition, in the example of FIG. 10, there is a gap between the inner surface 260a of the connection portion 260 and the side end portion 214b of the electrode plate 214. However, the inner surface 260a of the connection portion 260 and the side end portion 214b of the electrode plate 214 may be in contact with each other.

REFERENCE SIGNS LIST 1, 101, 201: electricity storage device, 10, 212: bipolar electrode, 11: collector plate, 13: positive electrode layer, 15: negative electrode layer, 17, 220: separator, 21, 121: spacer, 25, 125: resin frame, 202: electricity storage module, 214: electrode plate (collector plate), 216: positive electrode (positive electrode layer), 218: negative electrode (negative electrode layer), 230: frame, 240: first sealing portion (spacer), 241: first portion, 242: second portion, 250: second sealing portion (resin frame), 260: connection portion.

The invention claimed is:

1. A second battery in which a plurality of electrodes in which a positive electrode layer is provided on one surface of a collector plate and a negative electrode layer is provided on the other surface of the collector plate are stacked via separators, the second battery comprising:
a plurality of spacers arranged along peripheral edges of the collector plates between the collector plates adjacent to each other in a stacking direction; and
a resin frame collectively covering outer peripheries of the plurality of spacers,
wherein a spacer of the plurality of spacers has a first portion overlapping with the resin frame when viewed from the stacking direction and a second portion extending inward from the resin frame when viewed from the stacking direction,
wherein the first portion of the spacer is bonded to the resin frame,
wherein the second portion of the spacer is bonded to the collector plate,
wherein the resin frame is formed by injection molding, and
wherein an electrolytic solution is contained in a space partitioned by the collector plates adjacent to each other in the stacking direction and the spacer between the collector plates.

2. The second battery according to claim 1,
wherein the second portion does not overlap with any of the positive electrode layer and the negative electrode layer when viewed from the stacking direction, and
wherein the second portion has a portion overlapping with the separator when viewed from the stacking direction.

3. The second battery according to claim 1, wherein the spacer and the resin frame are formed with the same material.

4. The second battery according to claim 1, wherein the spacer is formed in a frame shape when viewed from the stacking direction.

5. The second battery according to claim 1, further comprising a connection portion connecting end portions of the spacers adjacent to each other in the stacking direction.

6. The second battery according to claim 1, wherein a protrusion amount of the spacer from an end surface of the collector plate that faces in a direction intersecting the stacking direction is equal to or larger than a thickness of the spacer in the stacking direction.

7. A second battery in which a plurality of electrodes in which a positive electrode layer is provided on one surface of a collector plate and a negative electrode layer is provided on the other surface of the collector plate are stacked via separators, the second battery comprising:
a plurality of spacers arranged along peripheral edges of the collector plates between the collector plates adjacent to each other in a stacking direction; and
a resin frame collectively covering outer peripheries of the plurality of spacers,
wherein an outer periphery of the collector plate is arranged in the resin frame,
wherein the outer periphery of the spacer has a convex shape toward the resin frame, and
wherein an electrolytic solution is contained in a space partitioned by the collector plates adjacent to each other in the stacking direction and the spacer between the collector plates.

8. The second battery according to claim 7, wherein the spacer and the resin frame are formed with the same material.

9. The second battery according to claim 7, wherein the spacer and the resin frame are formed with different materials.

10. The second battery according to claim 7, wherein a distal end of the outer periphery of the spacer extends to a position outside the outer periphery of the collector plate.

11. The second battery according to claim 7, wherein an inner peripheral surface of the resin frame has a concave shape corresponding to the convex shape of the outer periphery of the spacer.

12. The second battery according to claim 7, wherein an incision continuous from the outer periphery is formed on the peripheral edge of the collector plate.

13. A method for manufacturing a second battery, the method comprising:

fixing spacers to peripheral edges of collector plates in electrodes in which a positive electrode layer is provided on one surface of the collector plate and a negative electrode layer is provided on the other surface of the collector plate;

stacking a plurality of electrodes to which the spacers are fixed;

forming a resin frame by injection molding or hot plate welding to the spacers so as to collectively cover outer peripheries of the spacers fixed to the stacked plurality of electrodes; and forming a space partitioned by the collector plates adjacent to each other in the stacking direction and the spacer between the collector plates, wherein the space contains an electrolytic solution.

14. The method for manufacturing a second battery according to claim 13, further comprising connecting end portions of the adjacent spacers before forming the resin frame.

15. The second battery according to claim 1, wherein the outer periphery of each of the plurality of the spacers are welded to and integrated with the resin frame.

16. The second battery according to claim 1, wherein a separator is directly disposed on and continuously overlaps the negative electrode layer of an electrode of the plurality of electrodes.

* * * * *